US012249810B2

(12) United States Patent
Hoelzl et al.

(10) Patent No.: US 12,249,810 B2
(45) Date of Patent: Mar. 11, 2025

(54) PRETREATMENT METHOD FOR PRETREATING COMPONENTS PRIOR TO ELECTROPLATING

(71) Applicant: Robert Bosch GmbH, Stuttgart (DE)

(72) Inventors: Christoph Roland Hoelzl, Kornwestheim (DE); Martina Bubrin, Stuttgart (DE); Milan Pilaski, Mannheim (DE); Tim Bergmann, Hemer (DE)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 17/442,430

(22) PCT Filed: Mar. 18, 2020

(86) PCT No.: PCT/EP2020/057417
§ 371 (c)(1),
(2) Date: Sep. 23, 2021

(87) PCT Pub. No.: WO2020/193307
PCT Pub. Date: Oct. 1, 2020

(65) Prior Publication Data
US 2022/0190562 A1 Jun. 16, 2022

(30) Foreign Application Priority Data
Mar. 27, 2019 (DE) ..................... 10 2019 204 225.2

(51) Int. Cl.
*H01T 21/02* (2006.01)
*C23G 1/08* (2006.01)
(Continued)

(52) U.S. Cl.
CPC ............... *H01T 21/02* (2013.01); *C23G 1/08* (2013.01); *C23G 1/19* (2013.01); *C25D 5/36* (2013.01);
(Continued)

(58) Field of Classification Search
None
See application file for complete search history.

(56) References Cited

U.S. PATENT DOCUMENTS 2,760,929 A * 8/1956 Shepard ................ C25D 17/08 204/272
3,753,870 A 8/1973 Hoffmann
(Continued)

FOREIGN PATENT DOCUMENTS

DE 89764 A 5/1972
DE 000000089764 C 5/1972
(Continued)

OTHER PUBLICATIONS

International Search Report for PCT/EP2020/057417, Issued Jun. 29, 2020.
(Continued)

*Primary Examiner* — Louis J Rufo
(74) *Attorney, Agent, or Firm* — NORTON ROSE FULBRIGHT US LLP; Gerard A. Messina

(57) ABSTRACT

A pretreatment method for pretreating components, which are each formed of at least two different materials, prior to a coating process. The pretreatment method includes the steps: alkaline degreasing; chemical pickling in a first pickling medium; anodic pickling in a second pickling medium; and cathodic degreasing.

17 Claims, 3 Drawing Sheets

(51) Int. Cl.

| | |
|---|---|
| ***C23G 1/19*** | (2006.01) |
| ***C25D 5/36*** | (2006.01) |
| ***C25D 7/00*** | (2006.01) |
| ***C25D 7/04*** | (2006.01) |
| ***C25D 17/08*** | (2006.01) |
| ***C25D 17/10*** | (2006.01) |
| ***C25F 1/06*** | (2006.01) |

(52) U.S. Cl.
CPC ............... *C25D 7/003* (2013.01); *C25D 7/04* (2013.01); *C25D 17/08* (2013.01); *C25D 17/10* (2013.01); *C25F 1/06* (2013.01)

(56) References Cited

U.S. PATENT DOCUMENTS

| | | | | | |
|---|---|---|---|---|---|
| 4,497,693 | A * | 2/1985 | Ogura | C25D 5/02 204/297.08 |
| 4,670,684 | A * | 6/1987 | Kagawa | H01T 13/39 313/142 |
| 5,202,002 | A * | 4/1993 | Tsuchinaga | C23G 1/08 205/714 |
| 2005/0019496 | A1 * | 1/2005 | Yoshida | C23C 22/60 427/372.2 |
| 2007/0159046 | A1 * | 7/2007 | Yoshimoto | H01T 13/32 313/142 |

FOREIGN PATENT DOCUMENTS

| | | | | |
|---|---|---|---|---|
| DE | 4329290 | C2 | | 4/1998 |
| DE | 10237480 | A1 | | 2/2004 |
| DE | 102013226163 | A1 | | 6/2015 |
| GB | 1521966 | A | | 8/1978 |
| GB | 2281310 | A | | 3/1995 |
| JP | H0441693 | A | | 2/1992 |
| JP | H06235086 | A | | 8/1994 |
| JP | H06235088 | A | | 8/1994 |
| JP | H07303977 | A | | 11/1995 |
| JP | 2013095994 | | * | 5/2013 |
| JP | 2013095994 | A | | 5/2013 |
| JP | 2014522450 | A | | 9/2014 |
| JP | 2014218704 | A | * | 11/2014 |
| JP | 2015224355 | A | | 12/2015 |
| JP | 2017145438 | A | | 8/2017 |

OTHER PUBLICATIONS

Euze, H., Jelinek, T.W., Praktische Galvanotechnik, Lehrbuchreihe Galvanotechnik, 4, Erweiterte Auf, Saulgau: Eugen G. Leuze Verlag, 1988 Inhaltsverzeichnis, pp. 1-5.

* cited by examiner

PRETREATMENT METHOD FOR PRETREATING COMPONENTS PRIOR TO ELECTROPLATING

FIELD

The present invention relates to a pretreatment method for pretreating components, in particular, prior to a coating method. The present invention furthermore relates to a coating method for coating components.

BACKGROUND INFORMATION

The use of components, such as for example spark plug housings, which are made up of two or more different materials is conventional. Frequently, it is necessary to coat such components due to the risk of a strong corrosive attack in the use area of the components, for example in the highly corrosive surroundings in a combustion chamber of an internal combustion engine. However, the different materials frequently result in limitations during a coating of the components, in particular, during a pretreatment prior to the actual coating process. For example, the media used for pretreatment are, in general, specifically adapted to one of the materials and not suitable for multi-material components.

SUMMARY

The pretreatment method in accordance with an example embodiment of the present invention may offer the advantage over the related art of a pretreatment optimized for components made up of two or more materials. In the process, a one-piece component which includes at least two subareas, each made up of a different material, is regarded as such a component. In the process, each of the materials of the component is both sufficiently activated, in particular, with respect to a subsequent coating method, and simultaneously not excessively attacked to avoid damage. In this way, an entire surface of the component may be generated with particularly high quality.

This is achieved according to an example embodiment of the present invention in that the pretreatment method includes the following steps:

alkaline degreasing;
chemical pickling in a first pickling medium;
anodic pickling in a second pickling medium; and
cathodic degreasing.

As a result of the pretreatment method, it is possible to achieve optimal results with respect to a high-quality and reproducible pretreatment. In other words, in this way scrap may be kept particularly low during the manufacture of the components, with the condition of a certain quality level of the surface of the components. In particular, the pretreatment enables a subsequent coating of materials, e.g., chromium-containing nickel steel, which otherwise cannot be coated.

The steps preferably take place consecutively in the above-described order. As an alternative, it would also be possible to interchange the two latter steps, i.e., to carry out the cathodic degreasing prior to the anodic pickling.

In accordance with an example embodiment of the present invention, it is particularly favorable when the steps take place directly after one another, i.e., without further possible processing steps as intermediate steps. It shall be noted that a rinsing, which however shall not be regarded as a separate processing step, may advantageously take place after each of the method steps. In other words, the component is preferably rinsed between two consecutive method steps, which influence the surface of the component.

Preferably, a highly alkaline solution having a pH value of greater than or equal to 12 is used for the alkaline degreasing. The first pickling medium is advantageously a highly acidic medium, in particular, having a pH value of less than or equal to 1. In particular, a strong acid, such as hydrochloric acid, is suitable therefor. As an alternative, sulfuric acid or hydrofluoric acid may be used, for example.

The pretreatment method according to an example embodiment of the present invention enables a pretreatment which is optimally matched to components made up of multiple elements. In the process, it is possible that not only the individual subelements, of which the component may be made up, but, in particular, also present weld seams, which join the subelements to one another, are optimally pretreated. In the process, all of the surfaces of the subareas or of the weld seams are improved with respect to coatability or surface quality. The pretreatment method thus offers a particularly active pretreatment by which oxide layers present on the surfaces, or resulting from the welding, for example, may be removed particularly well to obtain a flawless surface of the component. In addition, a pretreatment with consistent quality is possible. During the pretreatment of components in large quantities, in this way scrap, for example insufficiently or excessively pretreated/activated components, may be kept particularly low.

Furthermore, it is particularly favorable when no anodic degreasing takes place subsequent to the cathodic degreasing. This means that, subsequent to the cathodic degreasing, during which the component is operated as a cathode by applying a voltage, no anodic degreasing takes place, during which the component is operated as an anode by applying an opposite voltage. In this way, it is avoided that the surface of the component comes in contact with elevated quantities of oxygen, which usually arises during the anodic degreasing. Otherwise, the surface of the component could oxidize due to the oxygen, i.e., an oxide layer could be formed thereon, which would be disadvantageous for possible subsequent methods, such as a coating method.

The pretreatment method in accordance with the present invention is particularly suitable for pretreating components which are formed of a combination of at least two different steels, to thereafter generate, in particular, a particularly high-quality coating. In general, it is difficult to cover mainly stainless steels or ordinary steels with a coating having high adhesive strength, in particular, when the pretreatment method is to be suitable for "normal" steel at the same time. However, the present pretreatment method is suitable for a wide variety of steel types and enables an optimal preparation of the component for subsequent manufacturing or processing methods.

Preferred refinements of the present invention are disclosed herein.

The second pickling medium is preferably a medium which is present in a slightly acidic to neutral range. In the process, a solution having a pH value of 4 to 8 is regarded as a medium in the slightly acidic to neutral range. The second pickling medium particularly preferably has a pH value of greater than or equal to 5 and less than or equal to 6.5. The second medium preferably includes a salt of nitric acid to enable a sufficiently active, but not too aggressive pretreatment. As an alternative, a use of salts of sulfuric acid in the second pickling medium would also be possible. Furthermore, it is favorable when a complexing agent is added to the second pickling medium. In this way, a particularly well-adapted pretreatment is possible, which enables an effective removal of oxide layers of the component and, at the same time, ensures that the different materials of the component are not excessively attacked.

The anodic pickling particularly preferably takes place at a voltage of at least 2 V and no more than 10 V. A voltage in the range of 2 V to 6 V, in particular, of 4 V, is particularly advantageous in the process. In this way, a particularly targeted treatment of the surface of the component may be made possible. By adapting the voltage, primarily a simple and effective adaptation of the pretreatment method to different materials and material combinations of the component is possible, it being possible to influence a removal of material at the surface of the component in a particularly targeted manner.

The cathodic degreasing preferably takes place in an alkaline solution. It is particularly favorable when the alkaline solution is a highly alkaline aqueous solution made up of sodium hydroxide or potassium hydroxide. In the process, a solution having a pH value of greater than or equal to 12 is regarded as a highly alkaline solution. To optimize the cathodic degreasing, a surfactant may also preferably be added. In addition, it is particularly favorable when a voltage of at least 3 V and no more than 15 V, in particular, of 5 V to 10 V, is applied to the component for the cathodic degreasing. In this way, furthermore an optimal adaptation of the pretreatment to different material combinations is possible with respect to a sufficient activation, without excessive attack of the surface of the component.

Further preferably, the pretreatment method furthermore includes the step:

pickling of the component.

The pickling takes place subsequent to the cathodic degreasing. As a result of the pickling, in particular, an alkaline solution adhering to the component from the step of the cathodic degreasing is removed. Preferably, a weakly acidic solution is used in the process for the pickling to neutralize the alkaline solution. In this way, the component may be prepared particularly well for a possible subsequent coating.

The component is particularly preferably a spark plug housing of a spark plug. The spark plug housing includes a housing base body and a ground electrode. The housing base body and the ground electrode are formed of the different materials. In this way, the housing base body and the ground electrode are adapted particularly well to the respective requirements, and additionally enable a cost-effective manufacture of the spark plug. The spark plug housing preferably furthermore includes a male thread to enable the spark plug to be screwed into a corresponding female thread. The spark plug housing furthermore advantageously includes a hexagonal section or a polygonal section to facilitate a handling with the aid of a tool.

It is particularly advantageous when the ground electrode is formed of a chromium-containing nickel steel. It is particularly preferred for the ground electrode to be formed of NiCr15Fe, NiCr23Fe15, or NiCr25FeAIY. In this way, the spark plug housing may be provided with a particularly resistant ground electrode to meet the high requirements of high-load and high-quality spark plugs. The spark plug housing is further preferably formed of "ordinary" steel, for example steel with the designation S235 or a material number of 1.0036 to 1.0038. As a result of the pretreatment method, an optimal uniform preparation of the entire surface of the spark plug housing is possible.

In accordance with an example embodiment of the present invention, the spark plug housing preferably includes a weld joint with the aid of which the housing base body and the ground electrode are joined to one another. In the process, oxide layers, which arise on the surface of the spark plug housing due to the welding process when the two components are welded together, may be easily and reliably removed by the pretreatment method. In this way, it is possible to optimally pretreat not only the respective surface of both subelements of the spark plug housing, but also the weld seam joining them, to provide a particularly high-quality surface of the spark plug housing, in particular, with respect to subsequent methods or processes.

The present invention furthermore relates to a coating method for coating components which were pretreated by the pretreatment method. It shall be noted that the pretreatment method may be regarded as a submethod of the coating method. In accordance with an example embodiment of the present invention, in the process, the coating method furthermore includes the step: generating the coating of the component. Basically, any type of coating, in particular, electroplating, may be carried out in the process, such as for example gold-plating, silver-plating, zinc-plating, or chrome-plating. However, the coating method is preferably a nickel-plating. It is particularly advantageous in the process when the generation of the coating, in particular, of a nickel coating, takes place with the aid of a nickel electrolyte. The nickel electrolyte advantageously has a concentration of at least 80 g/l to no more than 120 g/l, particularly preferably 100 g/l nickel. In the coating method, a particularly high-quality and uniform coating of the surface may be achieved due to the optimized pretreatment. In the process, primarily components made up of multiple different materials may be optimally completely coated with a coating having the lowest layer thickness fluctuations. In this way, very high-quality requirements with regard to the component, in particular, with respect to a corrosion protection, may be met. In this way, for example, it is easily possible to comply with a rust degree of Ri=2 according to DIN ISO 9277 for spark plug housings.

In accordance with an example embodiment of the present invention, the coating method furthermore preferably includes the step:

precoating the component prior to the step of generating the coating. The precoating preferably takes place with the aid of a low-concentration nickel electrolyte. In particular, a thin-walled coating of the component is generated in the process prior to the actual step of coating to obtain a particularly uniform and high-quality coating directly at the surface of the component. The low-concentration nickel electrolyte particularly preferably has a nickel concentration of at least 10 g/l and no more than 50 g/l, in particular, 15 g/l to 25 g/l.

Furthermore, it is particularly favorable when at least one subarea of a surface of the component is excluded from the pretreatment and/or the coating. This means that a defined partial coating of the component takes place. This takes place by covering the subarea during the pretreatment and/or the coating, so that the media used in the pretreatment and/or the coating cannot come in contact with the surface of the subarea. As an alternative or in addition, the subarea may be covered in such a way that it is protected, during the pretreatment and/or the coating, against a penetration of field lines of an electrical field into the subarea, i.e., is insulated with respect to the electrical field. Advantageously, a cover element made up of a resistant and/or electrically insulating material is used for covering the subarea. The subarea is particularly preferably covered during all steps of both the pretreatment method and the coating method to obtain an untreated and uncoated surface at the subarea. In this way, it is possible to adapt the surface of the component to a wide variety of requirements, for example to obtain coated subareas for an optimal corrosion protection, and also to obtain uncoated subareas for a further treatment or processing of these uncoated subareas.

Preferably, at least one of the method steps of the pretreatment method and/or of the coating method are carried out as a rack coating with the aid of a rack. It is particularly favorable in the process when the component is situated at the rack during the at least one method step. Furthermore, it is particularly advantageous when both the entire pretreatment method and the entire coating method are carried out with the aid of the rack. In this way, a particularly simple execution of the corresponding method steps, which is optimally adapted to the component, is possible. Moreover, a particularly high quality of the coating may be achieved after the coating process, since multiple components may in each case be individually situated at a rack at fixed positions in such a way that they do not make contact with one another during the method steps. In this way, it is primarily avoided that multiple components strike against one another, which may result in damage to the surfaces of the components. As an alternative, it would also be possible to carry out at least one of the method steps of the pretreatment method and/or of the coating method as a drum coating with the aid of a drum. In this case, at least one component is situated inside the drum while the at least one method step is being carried out. Using a drum coating, it is possible to carry out the pretreatment and/or the coating in a particularly simple and cost-effective manner.

The rack particularly preferably includes an internal anode. The internal anode is preferably situated in a through-opening of the component, while the at least one method step is being carried out. In this way, it is also possible in a simple manner to coat a breathing space of the component defined by the through-opening in a simple and reliable manner. The internal anode is preferably formed of a chemically resistant material. The internal anode is particularly preferably formed of platinized titanium. In this way, a high resistance is guaranteed, to permanently and reliably achieve a high quality of the coating.

In this way, an example embodiment of the present invention preferably also results in a method for manufacturing nickel-plated spark plug housings, including the steps:

- providing a spark plug housing including a ground electrode, which is formed of at least two different materials, a ground electrode of the spark plug housing being formed of a chromium-containing nickel steel;
- pretreating the spark plug housing using the pretreatment method, in particular, all surfaces of the spark plug housing;
- preferably nickel-preplating the spark plug housing; and nickel-plating the spark plug housing.

The present invention furthermore results in a component which was coated with the aid of the described coating method. The component is preferably a spark plug housing of a spark plug. A component coated by the coating method thus includes a permanently durable and high-quality coating, which is able to reliably and permanently withstand the high stresses, for example in corrosive surroundings in an internal combustion engine. As a result of the pretreatment method and the subsequent coating method, an optimal, high-quality coating of the housing base body, the ground electrode, as well as the weld seam is possible.

BRIEF DESCRIPTION OF THE DRAWINGS

The present invention is described hereafter based on one exemplary embodiment in connection with the figures. In the figures, functionally equivalent components are each denoted by identical reference numerals.

DETAILED DESCRIPTION OF EXAMPLE EMBODIMENTS

Figure 1:
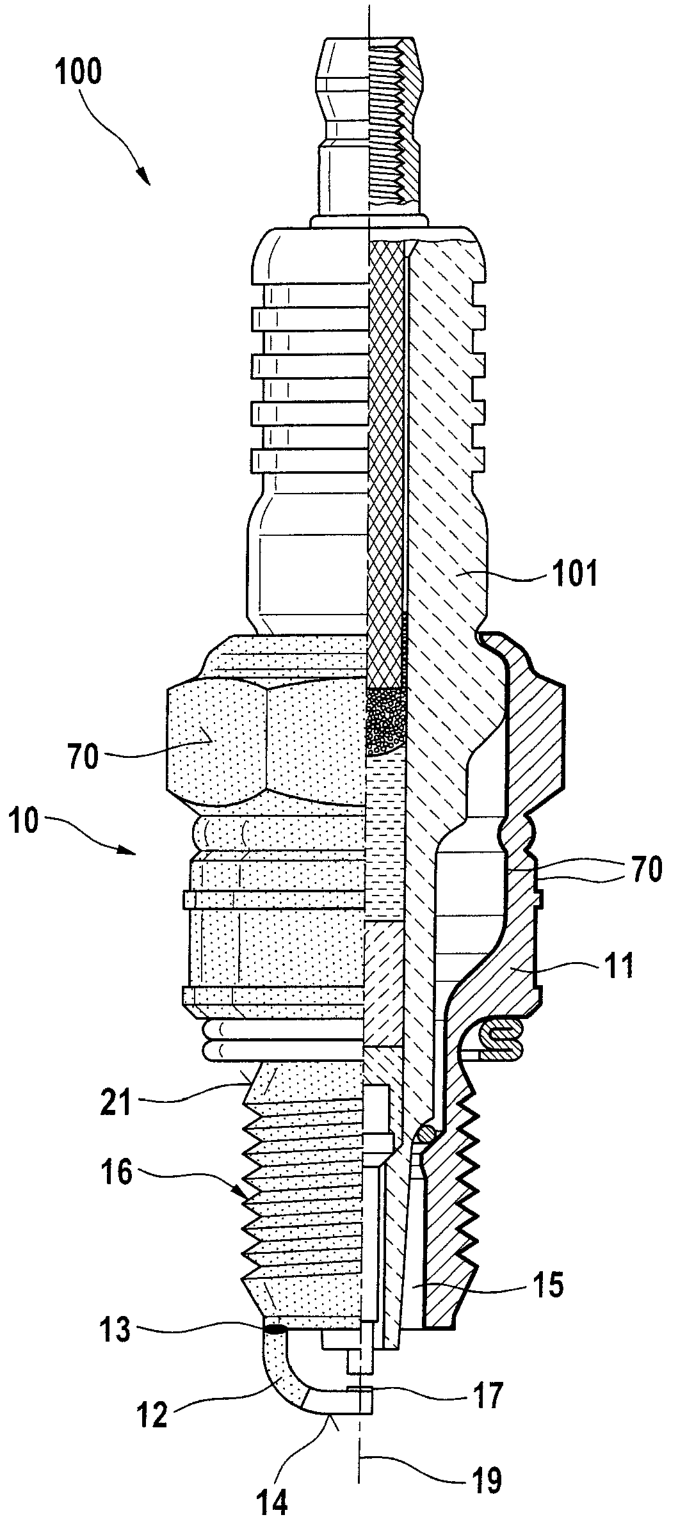
FIG. 1 shows a simplified schematic view of a spark plug housing in use at a spark plug, the spark plug housing having been pretreated and coated with the aid of a coating method according to one preferred exemplary embodiment of the present invention.

FIG. 1 shows a simplified schematic view of a component which was pretreated and coated with the aid of a coating method B according to one preferred exemplary embodiment of the present invention. The component is a spark plug housing 10. Spark plug housing 10 is an integral part of a spark plug 100 and includes a housing base body 11 and a ground electrode 12. Housing base body 11 is essentially concentrically designed with respect to a longitudinal axis 19 and includes a male thread 16 and a hexagonal section 20. With the aid of male thread 16, spark plug housing 10, and thus spark plug 100, may be screwed into a corresponding female thread of a cylinder head, which is not shown, of an internal combustion engine. Housing base body 11 is additionally designed to accommodate further components of spark plug 100, such as an insulator 101.

Housing base body 11 and ground electrode 12 are formed of two different materials and joined to one another with the aid of a weld joint 13. Ground electrode 12 is formed of a chromium-containing nickel steel, more precisely NiCr15Fe. Housing base body 11 is formed of ordinary steel, more precisely steel with the designation S235.

In addition, a plate 17 made up of a precious metal alloy is welded onto ground electrode 12 to withstand the particularly high stresses due to ignition sparks during the operation of spark plug 100.

To withstand the high stresses, primarily with respect to highly corrosive surroundings when spark plug 100 is used in a combustion chamber of an internal combustion engine, and to meet maximum quality standards, a coating of spark plug housing 10 in the form of a nickel coating 70 is provided. Nickel coating 70 is situated on the entire surface of spark plug housing 10, i.e., at its outer side as well as at its inner side, which is defined by a through-opening 15. It shall be noted that nickel coating 70 is not required on the entire inner side of spark plug housing 10. For example, a partial coating of the inner side or a thinner nickel coating 70 compared to the outer side is also possible. To generate nickel coating 70, spark plug housing 10 is coated with the aid of coating method B. Before the individual steps of coating method B are described in detail, initially an arrangement and handling of spark plug housing 10 for carrying out coating method B is explained with respect to FIG. 2.

Figure 2:
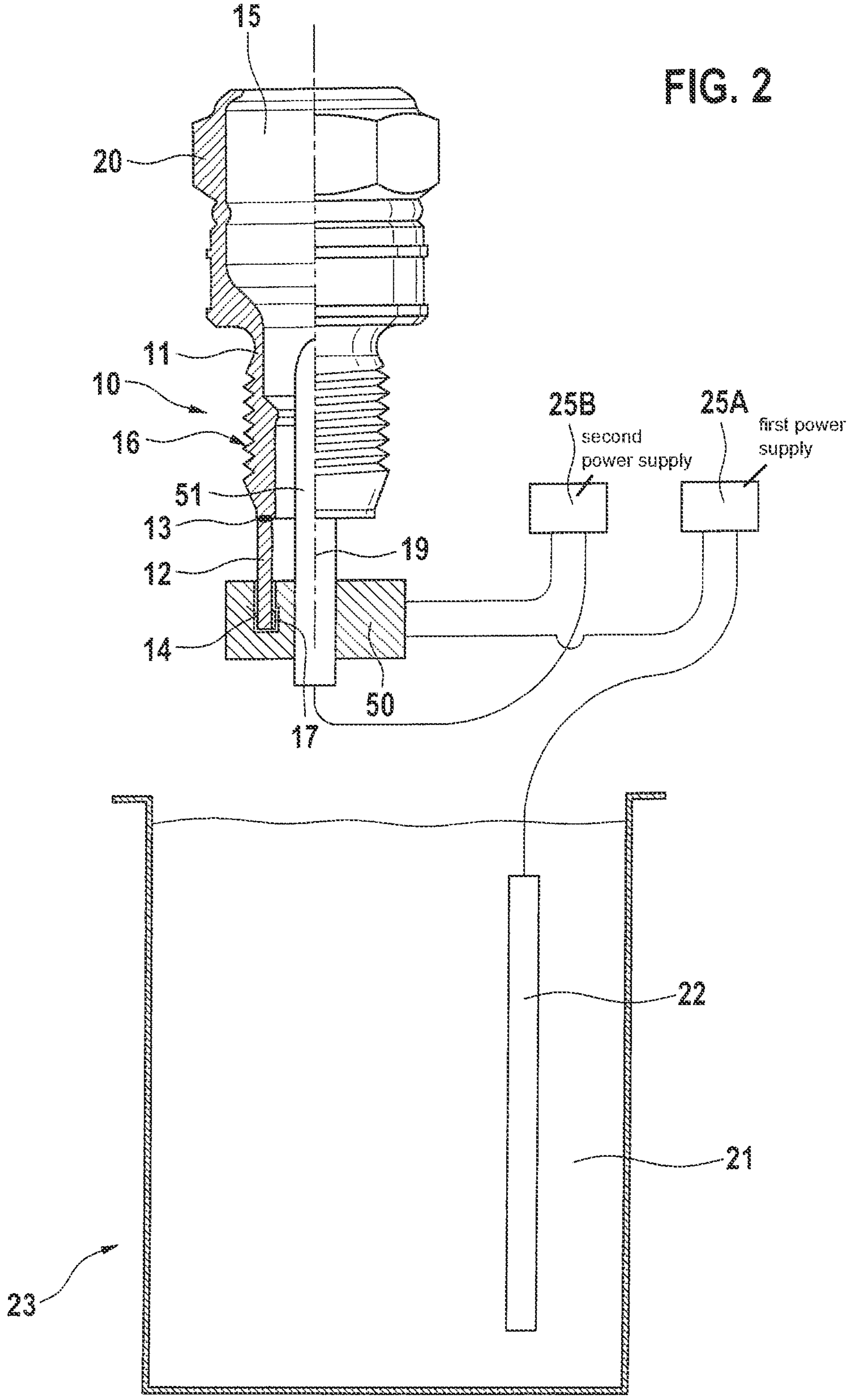
FIG. 2 shows a simplified schematic view of a set-up for carrying out the coating method of the spark plug housing of FIG. 1.

As is apparent from FIG. 2, ground electrode 12, in the illustrated uncoated state, extends away from housing base body 11 in a straight manner, i.e., in parallel to longitudinal axis 19. A bending into the shape illustrated in FIG. 1 takes place subsequently to coating method B. As a result of coating method B according to the present invention, a particularly high-quality and resistant nickel coating 70 is generated. It also withstands the subsequent bending without damage, for example without the coating flaking.

Furthermore, a subarea 14 of ground electrode 12 is covered before and while coating method B described hereafter is carried out. The covering effectuates a shielding of subarea 14 with respect to field lines of an electrical field during the coating. In this way, subarea 14 is excluded from coating method B and preserves its untreated and uncoated surface.

To facilitate a handling of spark plug housing 10 while coating method B is being carried out, a coating rack 50 is provided, as is apparent in FIG. 2. Coating rack 50 encompasses ground electrode 12 to achieve the covering and to hold spark plug housing 10. Moreover, an electrical contacting of spark plug housing 10 occurs. Furthermore, coating rack 50 includes a mandrel-shaped internal anode 51, which is insertable into a through-opening 15 of spark plug housing 10. Internal anode 51 and coating rack 50 are electrically insulated with respect to one another. Multiple spark plug housings 10 may be situated at coating rack 50 to enable a simultaneous coating of multiple spark plug housings 10. For the sake of clarity and vividness, however, only a single spark plug housing 10 is shown in FIG. 2.

Due to coating rack 50, a defined positioning of spark plug housing 10 is easily possible, to avoid a free movement of spark plug housing 10, and thus a possible striking against other spark plug housing 10. Moreover, a handling during coating method B is easily possible. For this purpose, coating rack 50, including the entire spark plug housing 10, may be immersed in a corresponding medium 21. In the process, medium 21 is situated in each case in an open receptacle 20. Furthermore, an electrode 22 is immersed in medium 21 inside receptacle 20. Depending on the method step, electrode 22 may be used as an anode or a cathode or neutrally. It shall be noted that all of the method steps of coating method B described hereafter are carried out as a dipping process. In this way, FIG. 2 may be regarded as being representative of all method steps, a different medium 21 being used for each of the method steps.

Figure 3:
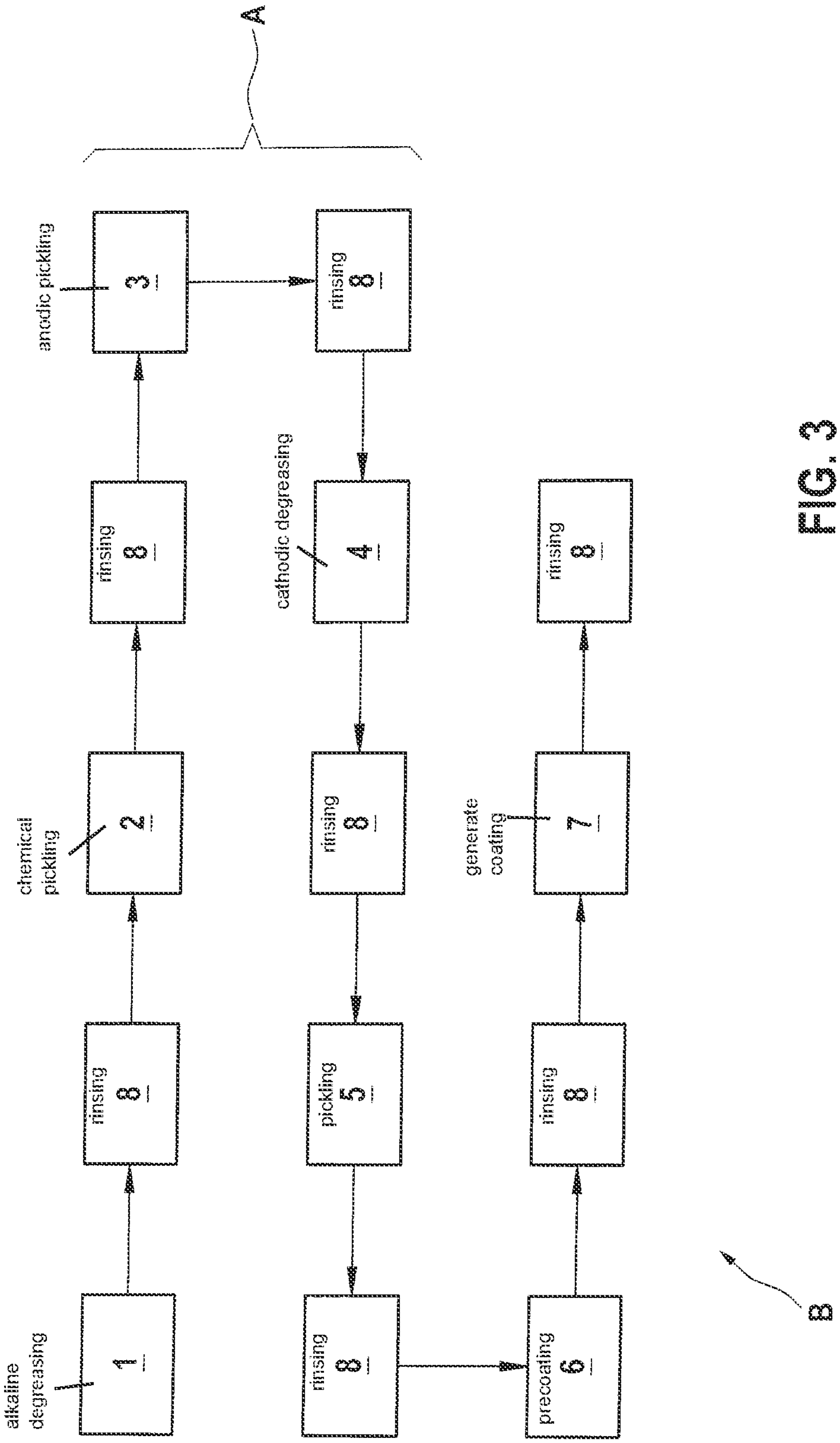
FIG. 3 shows a simplified schematic view of the sequence of the method steps of the coating method for pretreating and coating the spark plug housing of FIG. 1, in accordance with an example embodiment of the present invention.

The execution of coating method B is described hereafter with reference to FIG. 3. During coating method B, spark plug housing 10 consecutively undergoes the steps:

- alkaline degreasing 1 in a highly alkaline solution;
- chemical pickling 2 in a highly acidic first pickling medium;
- anodic pickling 3 in a slightly acidic second pickling medium;
- cathodic degreasing 4 in an alkaline solution;
- pickling 5 in a weakly acidic solution;
- precoating 6 in a low-concentration nickel electrolyte; and
- generating the coating 7 in a nickel electrolyte.

Steps 1 through 5 of coating method B are to be regarded as pretreatment method A.

After each of method steps 1 through 7, spark plug housing 10 is removed from corresponding medium 21. To remove residues of medium 21 adhering to the surface of spark plug housing 10 after the removal, a rinsing 8 of spark plug housing 10 takes place after each of method steps 1 through 7.

In the steps alkaline degreasing 1, anodic pickling 3, cathodic degreasing 4, precoating 6, and generating the coating 7, it is necessary to introduce current into spark plug housing 10 to operate spark plug housing 10 either as an anode or as a cathode. For this purpose, a first power supply unit 25A is provided (see FIG. 2). Spark plug housing 10 is connected to power supply unit 25A via coating rack 50. Furthermore, power supply unit 25A is connected to electrode 22 to also introduce a current. Furthermore, a second power supply unit 25B is provided, which is active during the step of generating the coating 7. In the process, a current is introduced into internal anode 51 by second power supply unit 25B, to also generate a nickel coating 70 at the inner side of spark plug housing 10.

As a result of coating method B, it is possible to achieve optimal results with respect to a high-quality and reproducible coating of spark plug housing 10. In this way, very high quality requirements with regard to spark plug housings 10, in particular, with respect to a corrosion protection, may be met, to manufacture particularly durable spark plugs 100.

Primarily as a result of pretreatment method A, a coating method B which is optimally adapted to the different properties of the different materials of which spark plug housing 10 is formed is made possible. As a result of pretreatment method A ideally matched to spark plug housing 10, which is formed of two different materials, it is thus possible to achieve a particularly high-quality and uniform nickel coating 70 of exterior areas and interior areas of spark plug housing 10. In the process, not only the individual subelements, i.e., housing base body 11 and ground electrode 12, of which spark plug housing 10 may be made up, but, in particular, also weld joint 13, which joins the two subelements to one another, are optimally pretreated. Pretreatment method A thus offers a particularly active pretreatment by which oxide layers present on the surface, which, in particular, resulted from the welding, may be removed particularly well to obtain a flawless surface of spark plug housing 10 prior to the actual generation of the coating 7. In this way, spark plug housings 10 may be coated with consistent quality with a nickel coating 70 by coating method B.

What is claimed is:

1. A coating method for coating a component which is formed of at least two different materials, the method comprising the following steps:
- pretreating the component using a pretreatment method including:
  - alkaline degreasing the component,
  - chemical pickling the component in a first pickling medium,
  - anodic pickling the component in a second pickling medium that is less acidic than the first pickling medium, and
  - cathodic degreasing the component; and
- generating a coating of the component using a nickel electrolyte.

2. The coating method as recited in claim 1, wherein the component is a spark plug housing.

3. The coating method as recited in claim 2, further comprising:
- precoating the component using a low-concentration nickel electrolyte, prior to the step of generating the coating.

4. The coating method as recited in claim 2, wherein the spark plug housing includes a housing base body and a ground electrode, the housing base body and the ground electrode being formed of different materials.

5. The coating method as recited in claim 4, wherein the ground electrode is formed of a chromium-containing nickel steel.

6. The coating method as recited in claim 4, wherein the ground electrode is formed of NiCr15Fe or NiCr23Fe15 or NiCr25FeAIY.

7. The coating method as recited in claim 4, wherein the spark plug housing includes a weld joint by which the housing base body and the ground electrode are joined to each other.

8. The coating method as recited in claim 1, further comprising:

covering at least one subarea of a surface of the component, thereby excluding the at least one subarea from:

at least one of the method steps of the pretreating; and/or the step of generating the coating.

9. The coating method as recited in claim 1, wherein (a) at least one of the method steps of the pretreating and/or (b) the step of generating the coating is carried out using, and while the component is situated at, a rack.

10. The coating method as recited in claim 9, wherein the rack includes an internal anode situated in a through-opening of the component while the (a) at least one of the method steps of the pretreating and/or (b) step of generating the coating is being carried out.

11. The coating method as recited in claim 1, wherein the second pickling medium is in a slightly acidic to neutral range, the second pickling medium including salts of nitric acid.

12. The coating method as recited in claim 11, wherein the second pickling medium includes a complexing agent.

13. The coating method as recited in claim 1, wherein the anodic pickling takes place under a voltage of at least 2 V and no more than 10 V.

14. The coating method as recited in claim 1, wherein the cathodic degreasing takes place in an alkaline solution.

15. The coating method as recited in claim 1, wherein the pretreating further includes, besides for the chemical pickling step and the anodic pickling step, pickling the component after the cathodic degreasing.

16. The coating method as recited in claim 1, wherein the chemical pickling and the anodic pickling are performed between the alkaline degreasing and the cathodic degreasing.

17. The coating method as recited in claim 16, wherein:

the cathodic degreasing is performed subsequent to the alkaline degreasing, the chemical pickling, and the anodic pickling; and the pretreating further includes, besides for the chemical pickling step and the anodic pickling step, pickling the component after the cathodic degreasing.

* * * * *